June 27, 1967  J. W. NELSON ETAL  3,328,556
PROCESS FOR NARROW GAP WELDING
Filed Oct. 20, 1965  6 Sheets-Sheet 1

JEROME W. NELSON
WALLACE J. LEWIS
INVENTORS

BY Gray, Mase, and
Dunson Attorneys

JEROME W. NELSON
WALLACE J. LEWIS
INVENTORS

BY *Gray, Mase, and Dunson* Attorneys

JEROME W. NELSON
WALLACE J. LEWIS
INVENTORS

BY *Gray, Mase, and Dunson* Attorneys

June 27, 1967  J. W. NELSON ETAL  3,328,556
PROCESS FOR NARROW GAP WELDING
Filed Oct. 20, 1965  6 Sheets-Sheet 5

JEROME W. NELSON
WALLACE J. LEWIS
INVENTORS

BY Gray, Mase, and
Dunson ATTORNEYS

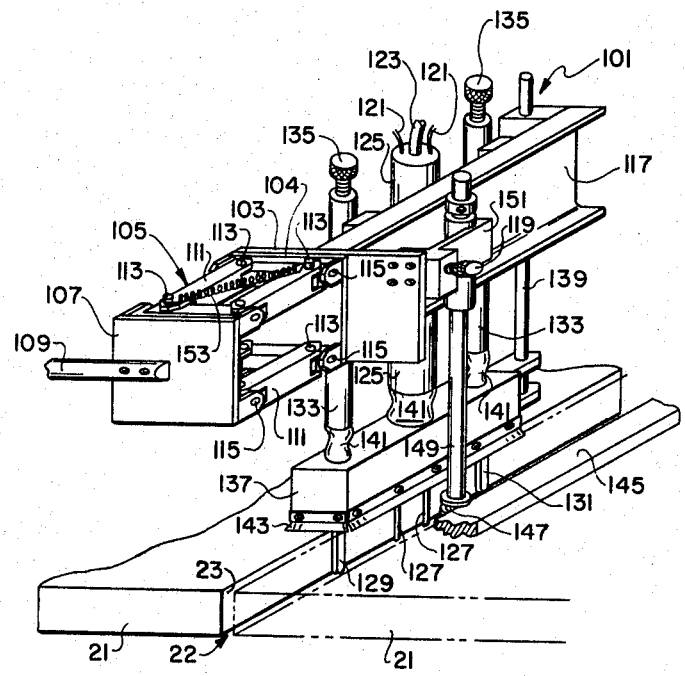

United States Patent Office 3,328,556
Patented June 27, 1967

3,328,556
PROCESS FOR NARROW GAP WELDING
Jerome W. Nelson, Columbus, Ohio, and Wallace J. Lewis, Sacramento, Calif., assignors, by mesne assignments, to The Battelle Development Corporation, Columbus, Ohio, a corporation of Delaware
Filed Oct. 20, 1965, Ser. No. 498,734
6 Claims. (Cl. 219—137)

This application is a continuation-in-part of our copending applicaation Ser. No. 298,342, filed July 29, 1963, now abandoned.

This invention relates to a method and apparatus for welding thick plate materials. It relates more particularly to an automatic process for welding thick plate materials separated by a very narrow groove. In its broad aspects, the process has application to all thick plate structures for downhand welding and for out-of-position welding. For example, the process can be used for butt or T joints in flat or curved plates in all welding positions. In its apparatus aspects, the invention concerns equipment that can be inserted deep in a narrow groove opening in thick plate and perform relatively continuous welding automatically or semiautomatically.

In the prior art thick plate structures are welded with a beveled or U-joint design from one side or both sides. These joint designs range from bevels with included angles of 30-degree to about 60-degree angles. With these joint designs or modifications of these designs, the cross-sectional area of the gap at the unwelded joint is relatively large and, consequently, the amount of weld metal necessary to fill the gap and make a satisfactory weld is also large. For example, for 2-inch-thick plate the opening at the top of the joint would be in the range of 1 inch. For thicker plate this opening would be much larger. The costs of welding these joints are high because of the high amount of weld metal required to fill the joint and the excessive amount of time required to accomplish the task.

In addition to the cost, considerable distortion occurs in conventional welds because distortion in weld joints is related to the volume of weld metal deposited. The amount of shrinkage which occurs in a weld determines the distortion produced by the weld; also, the total elastic strain energy introduced by residual stresses increases as the amount of weld metal increases. Therefore, in using conventional joint designs and conventional welding procedures, the large amounts of weld metal, distortion, and elastic strain energy, increases the tendency for the weld metal to crack and increases the susceptibility of the weldment to brittle fracture.

At the present time, automatic arc-welding processes are being used for making high-quality welds in thick plate in the downhand and vertical positions. These processes cannot be used to make high-quality welds in the overhead positions. Thick plate structures are now fabricated by automatically arc welding in the downhand position using joint designs which give wide joints. Automatic welding processes that are used in the downhand position includes submerged-arc and the gas-shielded metal inert-gas process. Most out-of-position joints in thick plate are welded manually or are welded with semiautomatic processes.

This invention is also very practical for flat or downhand welding of thick plates because of its time saving and economical features. One important consideration is obtaining optimum weld joint properties of certain high-strength low-alloy steels (for example, HY–80 and HY–140) by using very low heat input (as low as 7500 joules per inch up to about 30,000 joules per inch with high deposition rates) which is a natural characteristic of the narrow gap welding process. In conventional methods, low heat input with large joints becomes very uneconomical and high quality weld joint properties are customarily sacrificed for expediency and economy. With a consummable electrode, the method of this invention operates in the spray transfer range as contrasted to other automatic or semiautomatic gas-shielded metal-arc processes which operate in the droplet transfer, dip transfer or shorting-arc range to produce low heat inputs. The spray transfer range transfers metal in small particles across the arc. In the droplet transfer range (with arc voltages below about 23 volts), metal is transferred in relatively large globules; and, in the dip transfer or shorting arc ranges the electrode is periodically shorted out in the weld metal pool causing the voltage to go instantaneously to zero.

One advantage of the present invention is to provide a method for making welds automatically or semiautomatically by forming a very narrow groove and inserting the welding contact tube in the very narrow groove and filling this opening. Another advantage is to reduce the amount of weld metal and welding time. Still other advantages are to achieve a narrow weld zone with narrow heat-affected zones, to obtain optimum high mechanical properties by using low weld heat input deposits, and to provide a process which can be used to weld in all positions, flat, horizontal (for example, a horizontal joint in a vertically standing plate), vertical and overhead, and combinations of these.

Still another advantage is to provide an apparatus to weld thick materials with a narrow groove opening in all welding positions. Another advantage is to provide apparatus for producing small weld beads at low heat. Still another advantage is to provide welding equipment having a contact tube which can be positioned into a narrow groove opening in close proximity (substantially $\frac{1}{16}$ of one inch) to the joint sidewalls without shorting or arcing to the sidewalls. Still another advantage is to provide apparatus including means for automatically positioning the contact tube or tubes in a spaced relationship with respect to the sidewalls of the joint in spite of irregularities along the length of the joint.

Further advantages of the method and apparatus of this invention are as follows: to make satisfactory welds in thick plate of ½-inch and up in all positions; to weld an unusually narrow joint where the joint opening is as low as $\frac{3}{16}$ of an inch regardless of plate thickness; to form welds of unusual but highly desirable fusion line geometry, especially for multipass welds in thick plate (in the present invention, the fusion zone is substantially straight from the bottom to the top of joint); to accomplish efficient and economical welding by proper combination of welding variables (travel speed, weld wire feed, groove-opening, welding gas mixture, electrical voltage and current, etc.) in a weld controlled and substantially automatic process; to use a continuous arc, with relatively little fluctuation in amperage while making complete welds in all positions as required; and to form welds having highly advantageous mechanical properties.

Still other advantages will be apparent from a detailed description of the process and apparatus, the drawings and the claims that follow.

The process of this invention can be used for straight flat welds of abutting and T Members, e.g., joints or seams in flat and curved plates. Flat or curved plates may be welded in various positions and from various directions, vertical, horizontal, overhead, or otherwise. With suitable variations such as selected shielding gases known to those skilled in the art, the process can be used for metals other than steel. For example, argon–$CO_2$ shielding gas mixtures are preferably used for steel, and argon helium mixtures are preferably used for aluminum and titanium.

In conventional welding "out of position," i.e., in positions other than the downhand, the molten metal tends to flow out of the joint due to gravity. In the narrow-gap process, joint parameters are selected so that gravity is partially overcome by the surface tension forces created by the joint edges of the narrow gap joint; and, in addition, the size of the molten pool is controlled to be small so that it stays in the narrow groove regardless of position. The size of the molten pool as compared to the amount of surrounding joint metal also allows the joint metal to act as a large heat sink to rapidly reduce the weld metal temperature and cause very rapid solidification of the molten pool.

The welding process of this invention has wide flexibility. The process can be used with one filler wire or with several filler wires. The use of more than one filler wire increases the flexibility of the process. For example, when using two filler wires the width of the joint gap can vary substantially and good sidewall fusion can be maintained. The filler wires are preferably positioned on opposite sides of the longitudinal center line of the narrow joint with one filler wire guided along at a fixed distance from one joint edge and the other guided along at a fixed distance from the opposite joint edge. With this unique procedure the groove opening may vary and sidewall fusion will be maintained.

When two filler wires are used, the filler wires may be connected to a single D.C. power source or each electrode may be connected to separate D.C. power sources. When a single D.C. power source is used for more than one filler wire, the arc operates alternately from each electrode. Other variations may also be used. For example, one filler wire connected to a D.C. power source and another connected to an A.C. power source. Another example is to use three or more filler wires and connect them in many combinations. Connect one D.C. source to two wires and one D.C. source to the other or connect an A.C. source to one wire and a D.C. source to each of the other wires. The use of several filler wires and many different power sources are useable depending on the application, welding position, material, etc.

An important aspect of the invention is the integrated control of the operating variables. The limits and preferred values of these variables for the method in which the process can be used are shown in the following table.

this invention, shown in solid lines, to a conventional beveled joint, shown in dashed lines;

FIGS. 2, 3, 4, and 5 are line drawings showing examples of joint designs for narrow-gap welding, the individual figures being described as follows:

FIG. 17 is a section taken along the line 17—17 of

WELDING VARIABLES FOR NARROW GAP WELDING

| | Root Opening, Inch | | | Contact Tube to Work Distance, Inch | | | Arc Voltage | | | Welding Speed, i.p.m. | | |
|---|---|---|---|---|---|---|---|---|---|---|---|---|
| | Max. | Min. | Prefer. | Max. | Min. | Prefer. | Max. | Min. | Prefer. | Max. | Min. | Prefer. |
| Downhand Welding, Single wire | 3/4 | 1/8 | 1/4 | 1 1/2 | 1/8 | 1/2 | 32 | 10 | 26 | 100 | 5 | 20 |
| Downhand Welding, Multiple wire | 3/4 | 1/16 | 3/8 | 1 1/2 | 1/8 | 1/2 | 32 | 10 | 26 | 100 | 5 | 20 |
| Out-of-position Welding, Single wire | 3/4 | 1/8 | 1/4 | 1 1/2 | 1/8 | 1/2 | 32 | 10 | 26 | 100 | 20 | 30 |
| Out-of-position Welding, Multiple wire | 3/4 | 3/16 | 3/8 | 1 1/2 | 1/8 | 1/2 | 32 | 10 | 26 | 100 | 25 | 35 |

Another important variable is filler wire size. Generally a finer wire diameter is preferred for welding out-of-position—about 0.035 inch diameter. Larger diameter wires are preferred for downhand welding—about 0.0625 inch. However, the size of the wire depends on the material being welded and the desired metallurgical properties. (For maximum deposition a larger wire is used, but for metals requiring low weld temperatures, a smaller wire is used even in the downhand position.) For example, in out-of-position welding, 0.045-inch-diameter wire is preferred for aluminum and 0.035-inch-diameter filler wire is preferred for steel. Shielding gas mixtures vary with the material and are selected in accordance with their compatibility with the metal being welded.

Figure 1:
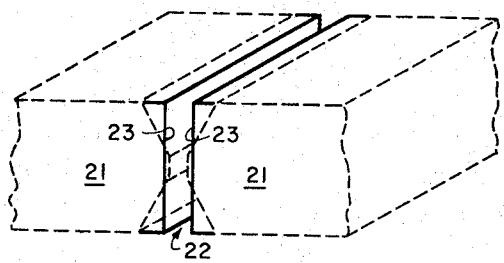

Further understanding of the invention can be accomplished by reference to the attached drawings, wherein:

FIG. 1 is a line drawing comparing the weld joint of

Figure 15:
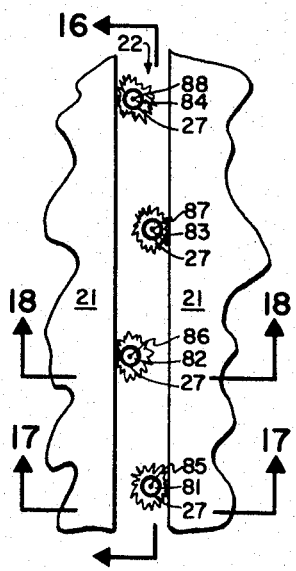
FIG. 15 is a plan view diagram of multiple wire welding showing the position of the filler wire (electrode), contact, etc., with respect to the joint.
Figure 18:
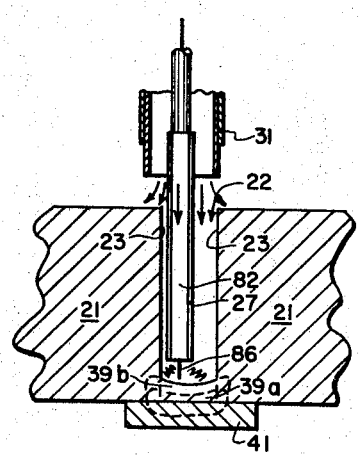
Figure 19:
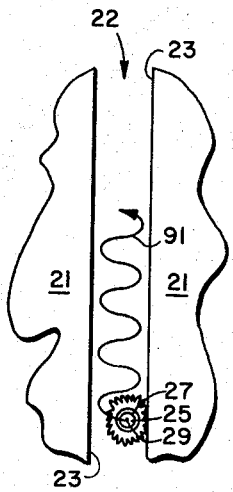
Figure 22:
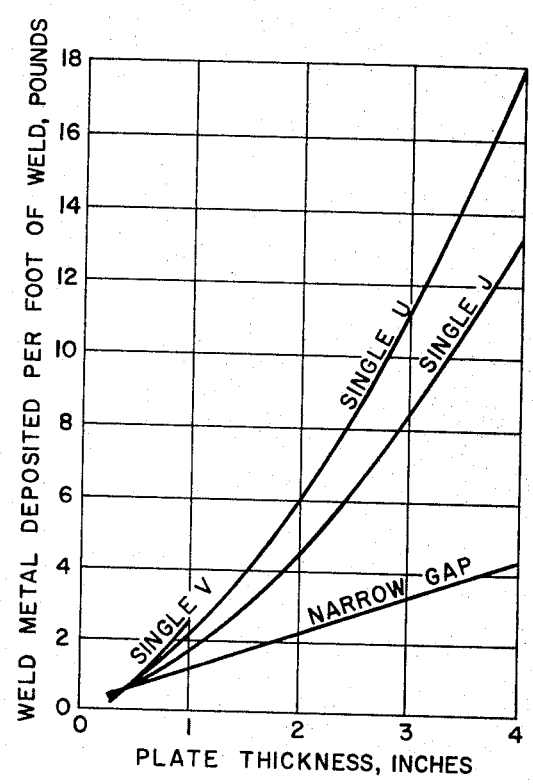

FIG. 15 showing the position of one contact tube riding near one joint edge;

FIG. 18 is a section taken along the line 18—18 of FIG. 15 showing another contact riding along the opposite joint edge;

FIG. 19 is a plan view of single wire welding showing the path of the electrode as it is oscillated in the joint;

FIG. 20 is a prospective view of apparatus for maintaining the electrode in spaced relationship to the joint sidewalls;

FIG. 21 is a sectional view through a joint showing another embodiment of apparatus for maintaining the electrode in spaced relationship to the joint sidewalls; and FIG. 22 is a graph comparing the amount of weld metal deposited in various conventional joints to the amount of weld metal deposited by the process of this invention.

In the drawings, the same reference numerals are applied to identical parts in all embodiments and such identically numbered parts are substantially idential in structure, function, and operation. Therefore, to eliminate confusing duplication, these parts, their interrelationship and their function will be described only in conjunction with a single embodiment, such description applying to all embodiments where these parts appear.

Referring to FIG. 1 and comparing the joint shown in solid lines to the joint shown in dashed lines, it will be seen that for comparable joints, much more weld material is required to fill the space of the conventional joint (shown in dashed lines) than the joint of this invention shown in solid lines. Another significant difference in joint preparation is that the simplified narrow gap joint is much more easily prepared since the sides of the gap do not necessarily need to be held to a specified angle in relationship to the surface of the plates to be welded. In short, much more tolerance is allowed so that simplified cutting methods can be used thereby eliminating expensive grinding operations, etc.

Figure 2:
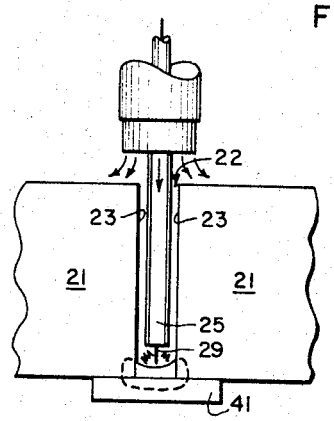
FIG. 2 shows a square butt joint having a narrow root opening with a backup bar which may also be a consumable backup.

FIG. 2 shows the square butt joint of FIG. 1 positioned for welding. Two plates 21—21 are aligned to form a narrow gap 22 having sides 23—23. The contact tube 25 is positioned in the narrow gap 22 so that the electrode 29 reaches the back-up plate 41.

Figure 3:
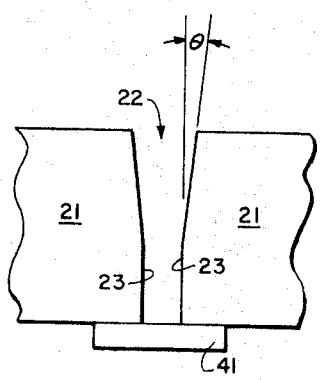
FIG. 3 shows a joint similar to FIG. 2 except the joint edges are slightly beveled.

FIG. 3 shows a modified square butt joint where two plates 21—21 are aligned to form a narrow gap 22 with sides 23—23. If desired, the open side of the joint may have the sides cut at a slightly beveled angle $\theta$ as shown in FIG. 3. The sides 23—23 of the joint are not required to be straight. A back-up bar 41 is positioned against the plates 21—21 to close off one side of the narrow gap 22.

Figure 4:
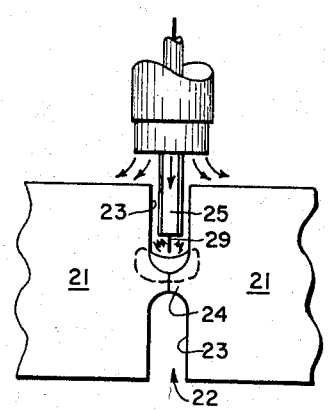
FIG. 4 shows a double U-joint design.

FIG. 4 is a double U-joint design. The plates 21—21 are cut off to form square joint edges 23—23, but land 24 is left remaining in the middle of the narrow gap 22. The sides 23—23 of the narrow gap could be beveled is desired. The land 24 functions much the same as the back-up bar 41 shown in FIGS. 2 and 3.

Figure 5:
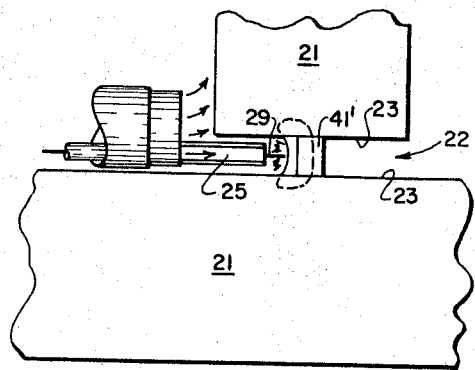
FIG. 5 is a narrow-gap joint design for welding T sections or stiffeners.

FIG. 5 is a narrow gap joint with the plates 21—21 arranged as a T-joint. A consumable spacer 41' is positioned between the plates 21—21 maintaining the edges 23—23 of the narrow gap 22 separated.

Figure 8:
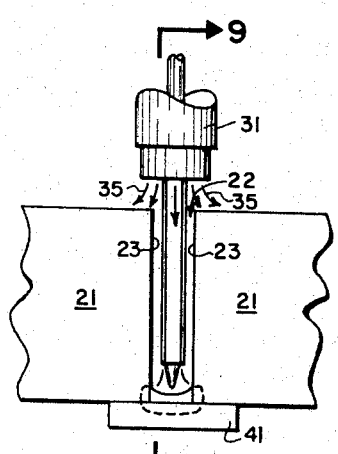
FIG. 8 is a diagram showing the process of this invention being used for welding a square butt joint from one side using a tungsten electrode for the arc and a cold filler wire. (In this system, a tungsten electrode is used with a separate filler wire)

In the present invention, narow-gap welds are made in joint designs shown in FIGS. 1, 2, 3, 4, and 5, and variations of these designs. Welds can be made with the inert-gas-shielded consumable-electrode process (FIG. 6) or with the tungsten-arc process (FIG. 8). In either event the procedures are similar. FIGS. 2 and 3 are examples of joint designs that are used where the welding has to be done from one side of the joint. FIGS. 4 and 5 are joint designs that are used when welding can be done from both sides of the joint. In FIG. 4 the joint edges are square, but could be beveled. A land is machined in this joint. In FIG. 5 the bar separating the two parts to be welded is a consumable back-up. The simplest joint to prepare is the joint having straight sides that are substantially parallel such as the examples shown in FIGS. 2 and 5. Conventional processes find these joints very difficult, if not impossible to weld yet with the process of this invention they are welded with ease.

Figure 6:
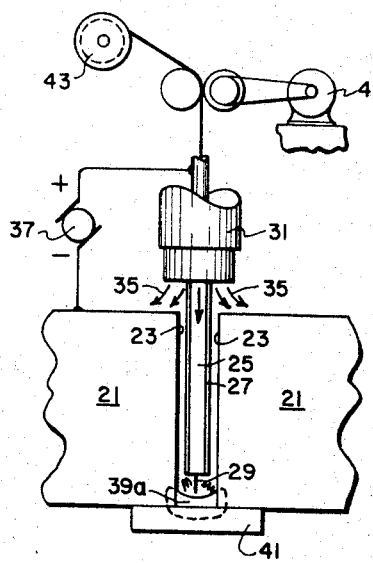
FIG. 6 is a diagram showing the process of this invention being used for welding a square butt joint from one side with an inert-gas-shielded, consumable electrode.

Referring now to FIG. 6, two plates 21—21 are aligned to form a narrow gap having sides 23—23. The contact tube 25 is positioned deep in the narrow gap for the first weld pass.

The contact tube 25 has a smaller diameter than conventional contact tubes. The diameter of the contact tube 25 varies with the gap opening and wire size used. For example, for ¼-inch wide gap, a ⅛-inch diameter contact tube would be used with about 0.035 to 0.0625-inch diameter filler wire. For a ⅛-inch wide gap, 0.010-inch diameter wire would be used with about a 0.06-inch diameter contact tube. The contact tube 25 is used as originally machined or is coated with a porcelain enamel or ceramic 27. The coating 27 prevents the contact tube 25 from shorting to the joint edges 23—23 in very narrow gap openings. The filler wire 29 is positioned in the center of the contact tube 25.

The gas shielding is applied through the telescopic concentric gas-shielding tube 31 positioned just above the top of the joint for each weld pass. The shielding gas (indicated by the arows 35—35) flows down into the joint and protects the arc and molten weld metal during welding.

Figure 7:
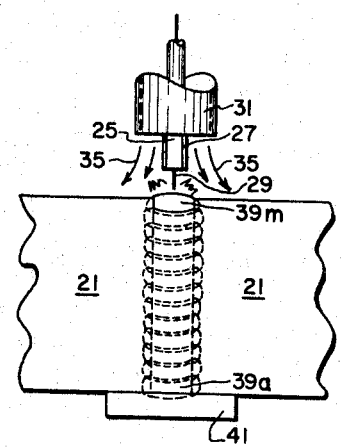
FIG. 7 is a diagram showing a later stage in the process shown in FIG. 6 and the position of the filler wire (electrode), contact tube, and shielding cup when the last weld pass is being deposited.

After the contact tube 25 and electrode 29 have been inserted in the joint, the shielding gas (arrows 35—35) is flowed through the cup 33 and an electrical welding power source 37 is connected. The first welding pass 39a is made. The molten weld pool fuses to the back-up bar 41 and to the joint sidewalls 23—23. Manipulation of the electrode 29 is not required (however, the electrode may be oscillated in a slightly wider joint, if preferred as shown in FIG. 19), and the welding process now becomes a matter of guiding the contact tube 25 and electrode 29 along the narrow root opening. The electrode 29 is stored on a spool 43 and is fed continuously at a constant rate by the drive system 45. Once the wire 29 is positioned properly, it is guided along the narrow gap automatically at a controlled speed. After the first pass is completed, the remainder of the passes are made one on top of each other until the joint is filled and pass 39m is deposited as shown in FIG. 7.

Figure 9:
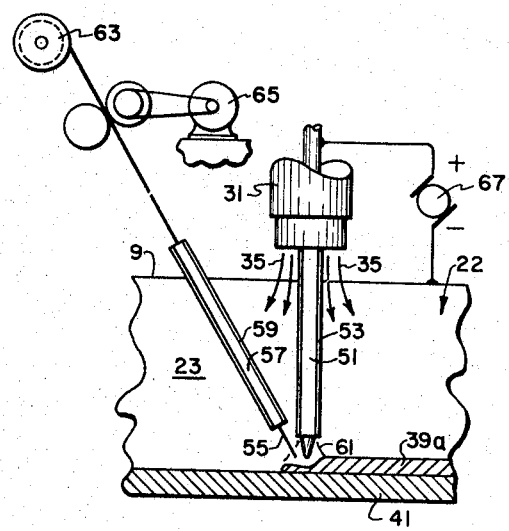
FIG. 9 is a section along the line 9—9 of FIG. 8.

FIGS. 8 and 9 show an example of narrow gap welding using a tungsten electrode. Two plates 21—21 are aligned to form a narrow gap 22 having sidewalls 23—23. A back-up bar 41 is positioned along one side of the gap 22. An elongated tungsten electrode 51 having an insulating cover 53 is positioned to form an arc at the side of the gap 22 that is closed by the back-up bar 41. The gas shielding is applied through a telescopic concentric gas shielding tube 31 positioned above the top of the joint for each weld pass. The shielding gas, indicated by the arrows 35—35, flows down into the joint and protects the arc and molten weld metal during welding.

The filler wire 55 is passed through a filler wire guide tube 57 that is positioned in the gap 22 and feeds the filler wire 55 directly into the arc 61. The filler wire guide tube may have a shielding cover 59. The filler wire 55 is stored on a spool 63 and is fed continuously at a constant rate by the drive system 65. The tungsten electrode is connected to an electrical power source 67. The first welding pass 39a is made and fuses to the back-up bar 41 and to the joint sidewalls 23—23. After the first pass is completed, the remainder of the passes are made one on top of each other until the joint is filled.

Figure 10:
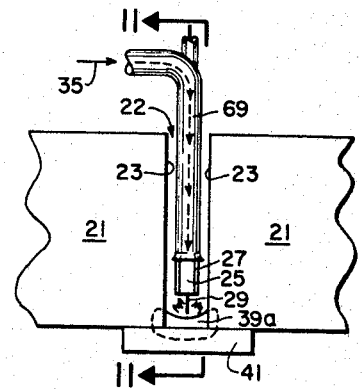
FIG. 10 is a diagram showing an embodiment of shielding cups or tubes that are inserted into the joint alongside the contact tubes.
Figure 11:
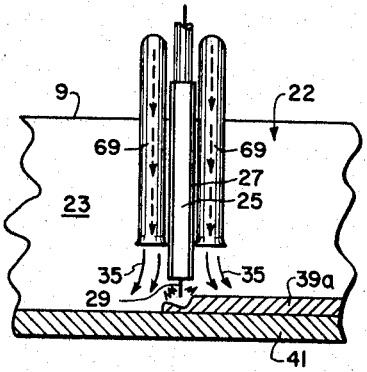
FIG. 11 is a section along the line 11—11 of FIG. 10.

FIGS. 10 and 11 show two plates 21—21 aligned to form a narrow gap joint 22 with sidewalls 23—23. The main difference over previous examples is the construction for applying the shielding gas. The flow of shielding gas, indicated by the arrows 35'—35', is applied to the weld area by shielding tubes 69—69 inserted into the gap 22. This construction delivers shielding gas very close to the welding area.

Figure 12:
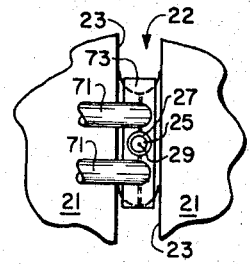
FIG. 12 is a plan view diagram showing another embodiment of shielding cups or tubes that are inserted into the joint alongside the contact tubes. (This shield is made so that a canopy seals the welding area off and a positive pressure is maintained)
Figure 13:
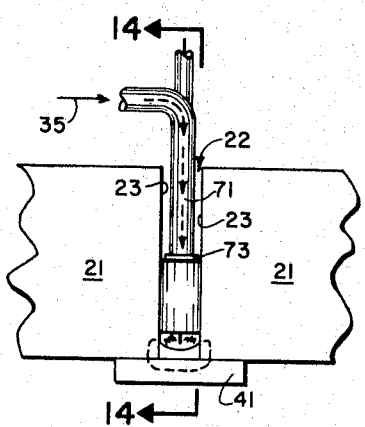
FIG. 13 is a side view of the diagram shown in FIG. 12.
Figure 14:
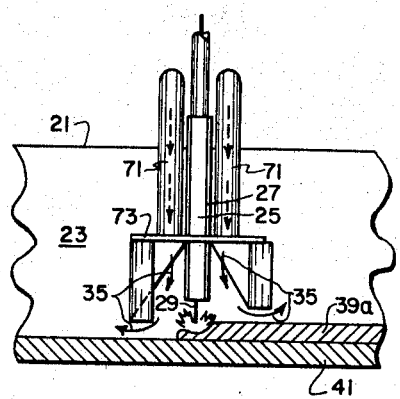
FIG. 14 is a section along the line 14—14 of FIG. 13.

Another construction for delivering shielding gas very close to the welding area is shown in FIGS. 12, 13, and 14. Two plates 21—21 are aligned to form a narrow gap 22. The shielding gas is introduced through tubes 71—71 to a plate 73 that is parallel to the line of travel of the welding. The plate 73 moves with the contact tube 25 and acts as a shield to hold the shielding gas near the weld area. Two other shields 75 and 77 are provided to precede and follow the welding arc. The three parts, 73, 75, and 77 then provide a canopy to maintain the shielding gas near the weld area.

FIGS. 15, 16, 17, and 18 are diagrams showing multiple electrodes or filler wires positioned in a narrow-gap joint design. Each contact tube 81, 82, 83, and 84 having electrodes 85, 86, 87, and 88, respectively, is coated with ceramic insulation material 27 to prevent shorting to the joint edges 23. The contact tubes 51–54 can be supported by one barrel assembly or they can be attached to separate barrel assemblies. The contact tubes 81–84 are positioned in the narrow gap 22 so that one electrode precedes the other. The positioning of the electrodes 85–88 depends on gap opening, welding position, material, etc. For welding steel with a root opening between ¼ and ½ inch in all welding positions, the contact tubes would be positioned about ⅟₁₆ inch from each joint edge and about 1 inch apart or one or more of the electrodes are automatically oscillated across the entire joint or part of the joint as shown in FIG. 19. Other distances are, of course, also workable, and variations of spacing depend on root opening, wire size, material, etc.

Figure 16:
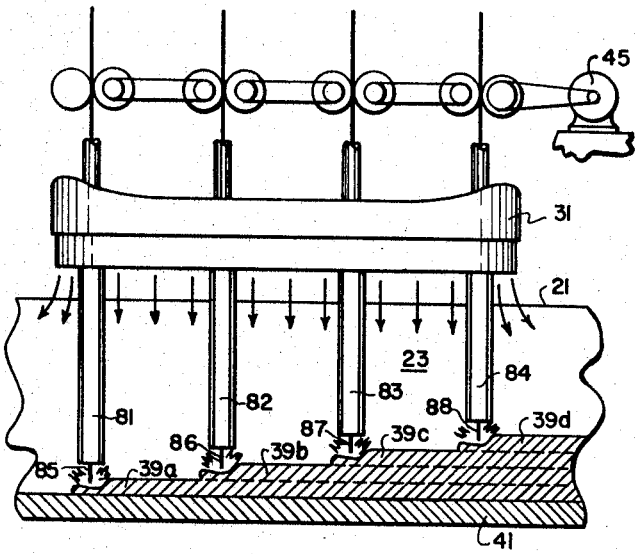
FIG. 16 is a section taken through the line 16—16 of FIG. 15 showing the operation and weld pass sequence.

FIG. 15 shows the positional relationship of the contact tubes 81–84 with respect to the sidewalls 23—23 and to each other. FIG. 16 shows that the electrodes 85–88 follow one another with electrode 85 laying down a first bead 39a, electrode 86 laying down a second bead 39b, etc. so that a number of weld passes are made by one pass of the equipment using a multiple number of electrodes.

Figure 17:
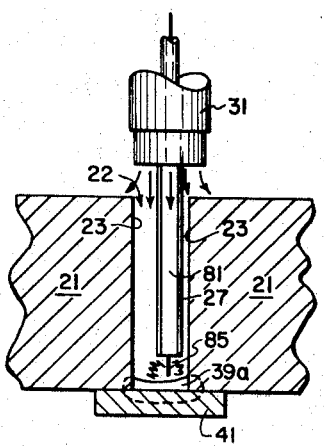

FIGS. 17 and 18 are sections through FIG. 15 showing the positional relationship of the contact tubes within the narrow gap 22 when using equipment with multiple electrodes.

When two electrodes are used, the electrodes may be connected to a single power source or each electrode may be connected to a separate source of power. In welding with this process using a single power source, some typical welding conditions are: (1) filler wire 0.035-inch diameter, (2) shielding gas mixture dependent on material being welded, (3) wire stick out ½ inch, (4) arc voltage 25, (5) amperage 380, and (6) travel speed 40 i.p.m. Wide ranges of each of these conditions are useable depending upon welding position and type of material. When a single power source is used for both electrodes and the arc fires alternately from each electrode, one electrode arcs at maximum voltage while the other is at zero voltage. The on-off time of each electrode follows a pattern depending upon the shielding gas mixture that is used. For example, when a shielding gas mixture of 80 percent argon and 20 percent carbon dioxide is used, the arc time is about 0.04 second for each electrode. When a shielding gas mixture of 60 percent helium and 40 percent argon is used, the arc time is about 0.01 second for each electrode. One of the difficulties in welding out-of-position is overcoming the gravitational forces of the molten pool. With the intermittent arc the pool has time to solidify during the "off" time. In this way the molten pool is controlled more easily.

The electrodes can also be connected to a power source for each wire. The advantage of this procedure is that the voltage and amperage of each filler wire can be controlled. A typical set of conditions for steel using this procedure is: (1) shielding gas mixture 80 percent argon and 20 percent carbon dioxide, (2) travel speed 35 i.p.m., (3) wire stick out ½ inch, (4) arc voltage (lead wire) 26, (5) arc voltage (trail wire) 25, (6) amperage (lead wire) 230, and (7) amperage (trail wire) 190. A wide range of conditions can be used depending upon the welding position and the material being welded.

FIG. 19 shows a method of welding a narrow gap with a single electrode wherein it would be customary to use two electrodes or wherein it would be customary to make a pass along each side of the joint. Two plates 21—21 are aligned to form a narrow gap 22 having sides 23—23. The contact tube 25 is positioned in the joint with the electrode 29 toward one side. After the arc is formed and welding begins, the contact tube is oscillated back and forth as it moves along the gap 22 so that the electrode follows the path shown by the arrow 91. This method is slower, of course, than using two electrodes, but desirable for some applications.

FIG. 20 shows a floating welding head that is especially useful for carrying out the method of this invention. The welding head 101 has a plate 103 that is bolted to the plate 104 of a parallelogram mount 105 having a second plate 107 with a spindle 109 that is attachable to the carriage (not shown). The carriage carries the spools of filler wire and drives the welding head along the joint.

The parallelogram mount 105 includes four bars 111—111 mounted between plates 104 and 107 having pivots 113—113 at each end that allow plates 104 and 107 to move horizontally with respect to each other and pivots 115—115 that allow plates 104 and 107 to move vertically with respect to each other. Consequently, the welding head 101 may move horizontally or vertically in a plane parallel to plate 107.

The welding head 101 includes a frame 117 attached to the plate 103. The filler wires 121—121 and shielding gas tube 123 pass through a barrel 125 that is attached to the frame 117. The barrel 125 also supports contact tubes 127—127 positioned in the joint gap 22. The frame also supports a forward guide 129 and a rear guide 131 which are positioned in the gap 22 to ride on the bottom of the joint and maintain the contact-tube-to-work-distance. The guides 129 and 131 are each positioned in a barrel 133 and are each adjustable by means of an adjustment screw 135.

A shielding gas cup 137 is mounted to float with respect to the head 101 so that the cup is always riding against the top of the plates 21—21. The cup 137 is slideably mounted on a rod 139 affixed to frame 117. The shielding cup is also attached to barrels 125, 133—133 by means of flexible tubes 141. A flexible skirt 143 is also provided around the open end of cup 137. The above arrangement of shielding cup 137, guides 129 and 139, and contact tubes 127—127 provides three shielding gas chambers in the joint. A first chamber is positioned between guide 129 and the nearest contact tube 127; a second chamber is positioned between contact tubes 127—127; and a third chamber is positioned between guide 131 and the nearest contact tube 127. Thus, the entire weld area is enclosed in a moving, closed, gas chamber.

The welding head 101 is positioned laterally with respect to the joint by a bar 145 that serves as a guide for roller 147. The bar 145 is positioned parallel to the joint and clamped in place on one of the plates. The roller 147 is rotatably attached to a rod 149. The rod 149 is attached to a mount 151 slideably mounted on plate 103 and adjustable with respect to plate 103 by means of an adjusting screw 119. The parallelogram mount 105 is biased by means of a spring 153 to hold the roller 147 against the guide bar 145.

The welding head 101 is moved along by the carriage (not shown) attached to plate 107 and is guided through the gap 22 by means of the roller 147 and guide bar 145 and the guides 129 and 131. When the apparatus is used for overhead welding, the head 101 is biased toward the "bottom" of the joint by means of counterweights (not shown) selected to maintain the guides 129 and 131 at a suitable pressure against the "bottom" of the joint. It is also possible to construct the welding head 101 so that each contact tube 127 is mounted separately and each provided with a separate roller 147 and guide bar 145 so that each contact tube is guided off a separate track or bar 145 positioned according to one sidewall 23 of the joint.

Another method of guiding the contact tubes with respect to the sidewalls 23—23 of the joint is shown in FIG. 21. The contact tubes 127–127' are suspended from separate mounts 155 and 157. Mount 155 is provided with a means such as spring 159 that biases contact tube 127 toward sidewall 23. Contact tube 127 is provided with a spring clip 161 that contacts sidewall 23 and maintains the contact tube 127 a constant distance from sidewall 23 regardless of the irregularities of sidewall 23. Mount 157 is similarly biased with a spring 163 and contact tube 127' provided with a spring clip 165 to maintain contact tube 127' a constant distance from sidewall 23'.

FIG. 22 is a group of curves showing the relationship of conventional welding method as compared to the narrow gap welding method of this invention on the basis of amount of weld metal deposited vs. plate thickness. Note that there the curves for three conventional joint configurations are shown (single V, U and J) and the difference in amount of weld material deposited as compared to the narrow gap process is considerable. Thus the narrow gap process of this invention represents a considerable saving of both material and time.

It will be understood, of course, that while the forms of the invention herein shown and described, constitute preferred embodiments of the invention, it is not intended to illustrate all possible forms of the invention. It will also be understood that the words used are words of description rather than of limitation and that various changes in shape, size, and arrangement of parts my be made without departing from the spirit and scope of the invention herein disclosed.

What is claimed is:

1. A method of welding metal plates comprising the steps of:
    (a) aligning the plates to form a joint having a narrow width opening;
    (b) extending an electrode through said narrow width opening;
    (c) connecting said electrode to a source of power and forming an arc to deposit molten metal in said joint;
    (d) regulating the voltage and amperage of the electrical power source to control the deposit of molten metal at low heat in the spray transfer range; and
    (e) positioning said electrode in said joint while moving said electrode along the joint to deposit molten metal by guiding the welding head and the contact tube holding said electrode, said welding head being guided by sensing the path of said joint and said contact tube being guided with respect to one of the sidewalls of said joint by sensing variations in said one of the sidewalls transverse to the electrode movement.

2. A method of welding metal plates comprising the steps of:
    (a) aligning the plates to form a joint having a narrow width opening;
    (b) extending an electrode through said narrow width opening;
    (c) connecting said electrode to a source of power and forming an arc to deposit molten metal in said joint;
    (d) controlling the voltage and amperage of the electrical power source to weld at a heat input of 7,500 to less than 30,000 joules per inch; and
    (e) positioning said electrode in said joint while moving said electrode along the joint to deposit molten metal by guiding the welding head and contact tube holding said electrode, said welding head being guided by sensing the path of said joint and said contact tube being guided with respect to one of the sidewalls of said joint by sensing variations in said one of the sidewalls transverse to the electrode movement.

3. A method of welding metal plates comprising the steps of:
    (a) aligning the metal plates to form a joint having an opening at least one-eighth inch wide as a lower limit and a depth to width ratio of at least eight to one, said plates being at least one inch thick;
    (b) extending an electrode through said opening;
    (c) connecting said electrode to a source or power and forming an arc to deposit molten metal in said joint;
    (d) controlling the voltage and amperage of the electrical power source to weld at a heat input of 7,500 to less than 30,000 joules per inch; and
    (e) automatically controlling the position of said electrode in said joint while moving said electrode along the joint to deposit molten metal by sensing variations in the sidewalls of said joint.

4. A method of welding metal plates in any position, comprising the steps of:
    (a) aligning the plates to form joint having a narrow width opening;
    (b) positioning two electrodes in said joint with each electrode extending through said joint from one side to the other;
    (c) connecting said two electrodes to a single electrical power source to form an arc that exists alternately between one of said two electrodes and said plates and then between the other one of said two electrodes and said plates, each of said two electrodes depositing molten metal in said joint, whereby intermittent arcing of said two electrodes maintains the heat input of each one of said two electrodes at less than 30,000 joules per inch; and
    (d) making successive passes along the joint until the desired weld is completed.

5. A method of welding metal plates in any position, comprising the steps of:
    (a) aligning the plates to form a joint having a narrow width opening;
    (b) positioning at least two electrodes in said joint with each electrode extending through said gap from one side to the other;
    (c) connecting each electrode to a separate electrical power source and forming an arc from each electrode to deposit molten metal in said joint;
    (d) regulating each of said electrical power sources from about 10 to 32 volts and from about 150 to 300 amps; and
    (e) making successive passes along the joint at a speed of from 5 to 75 inches per minute, said speed being increased as said voltage and amperage is increased to maintain the heat input of each one of said at least two electrodes at less than 30,000 joules per inch.

6. A method of welding metal plates in any position, comprising the steps of:
    (a) aligning the plates to form a joint having a narrow width opening;
    (b) positioning an electrode in said joint with said electrode extending through said joint from one side to the other;
    (c) connecting said electrode to a source of electrical power and forming an arc to deposit molten metal in said joint;
    (d) regulating the electrical power source from about 10 to 32 volts and from about 150 to 300 amps; and
    (e) making successive passes along the joint at a speed of from 5 to 75 inches per minute, said speed being increased as said voltage and amperage is increased to provide a heat input of less than 30,000 joules per inch.

References Cited

UNITED STATES PATENTS

| | | | |
|---|---|---|---|
| 2,452,189 | 10/1948 | Helmkamp | 219—124 X |
| 2,743,343 | 4/1956 | Anderson | 219—124 |
| 2,837,627 | 6/1958 | Soulary | 219—137 |
| 2,892,070 | 6/1959 | Kitrell | 219—60 X |
| 3,084,246 | 4/1963 | Rieppel et al. | 219—137 X |
| 3,123,702 | 3/1964 | Keidel et al. | 219—74 |
| 3,131,283 | 4/1964 | Dawson | 219—60 |
| 3,210,515 | 10/1965 | White | 219—74 |

JOSEPH V. TRUHE, *Primary Examiner.*

RICHARD M. WOOD, *Examiner.*

UNITED STATES PATENT OFFICE
CERTIFICATE OF CORRECTION

Patent No. 3,328,556                 June 27, 1967

Jerome W. Nelson et al.

It is hereby certified that error appears in the above numbered patent requiring correction and that the said Letters Patent should read as corrected below.

Column 2, line 53, for "weld" read -- well --; column 5, line 69, for "0.0625" read -- 0.625 --; column 9, line 63, for "or" read -- of --.

Signed and sealed this 24th day of September 1968.

(SEAL)
Attest:

Edward M. Fletcher, Jr.                 EDWARD J. BRENNER
Attesting Officer                      Commissioner of Patents